US012142445B2

(12) United States Patent
Wand

(10) Patent No.: US 12,142,445 B2
(45) Date of Patent: Nov. 12, 2024

(54) CONTACTOR WELD RELEASING SYSTEMS AND METHODS

(71) Applicant: FORD GLOBAL TECHNOLOGIES, LLC, Dearborn, MI (US)

(72) Inventor: Thomas Joseph Wand, Redmond, WA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 223 days.

(21) Appl. No.: 18/052,007

(22) Filed: Nov. 2, 2022

(65) Prior Publication Data

US 2024/0145194 A1 May 2, 2024

(51) Int. Cl.
*H01H 47/00* (2006.01)
*H01H 50/54* (2006.01)

(52) U.S. Cl.
CPC .......... *H01H 47/002* (2013.01); *H01H 50/54* (2013.01); *H01H 2047/003* (2013.01)

(58) Field of Classification Search
CPC . H01H 47/002; H01H 50/54; H01H 2047/003
USPC .......... 361/62
See application file for complete search history.

(56) References Cited

U.S. PATENT DOCUMENTS 4,412,137 A * 10/1983 Hansen .......... F02N 11/0866 307/10.6
6,023,110 A * 2/2000 Henrion .......... H01H 47/004 307/125
9,260,015 B2 2/2016 Gonzales et al.
10,017,071 B2 7/2018 Namou et al.
10,516,189 B2 12/2019 Loftus et al.
2011/0084704 A1* 4/2011 Myoen .......... H02H 9/001 324/538
2015/0137755 A1* 5/2015 Sadano .......... B60L 53/16 320/109
2015/0191088 A1* 7/2015 Gonzales .......... B60L 3/0046 701/34.2
2017/0205455 A1* 7/2017 Weicker .......... G01R 31/3277
2019/0385804 A1* 12/2019 Burkman .......... H01H 3/001
2020/0209314 A1* 7/2020 Bonetti .......... G01R 31/3278
2020/0317076 A1* 10/2020 Wang .......... B60L 3/0023
2021/0097785 A1 4/2021 Zhang et al.
2021/0102998 A1* 4/2021 Azidehak .......... G01R 31/52
2022/0219542 A1 7/2022 Wang et al.
2022/0379729 A1* 12/2022 Tabatowski-Bush ..... B60L 3/04
2024/0109451 A1* 4/2024 Harris .......... B60L 53/14

FOREIGN PATENT DOCUMENTS

WO 2022119591 A1 6/2022

* cited by examiner

*Primary Examiner* — Dharti H Patel
(74) *Attorney, Agent, or Firm* — David B. Kelley; Carlson, Gaskey & Olds, P.C.

(57) ABSTRACT

Systems and methods are provided for releasing welded-shut contactors of a contactor system. An exemplary contactor system may include a contactor and a controller. The controller may be programmed to command a vibration across portions of the contactor as part of a weld release control strategy when the contactor is welded closed. The vibration may be achieved by repeatedly alternating between energizing and de-energizing a coil of the contactor in order to mechanically shock/vibrate a welded contact of the contactor.

20 Claims, 4 Drawing Sheets

CONTACTOR WELD RELEASING SYSTEMS AND METHODS

TECHNICAL FIELD

This disclosure relates generally to electrified vehicles, and more particularly to vehicle systems and methods for releasing contactor welds to preserve vehicle operability.

BACKGROUND

Electrified vehicles are selectively driven by one or more electric machines. The electric machine can propel the electrified vehicle instead of, or in combination with, an internal combustion engine. A traction battery pack can power the electric machine.

A contactor system electrically couples the traction battery pack to various powertrain components of a vehicle high voltage bus. One or more contactors of the contactor system may isolate the traction battery pack from the components when opened and may operably connect the traction battery pack to the components when closed. Some battery operating conditions can cause the contactor contacts to weld closed.

SUMMARY

A contactor system according to an exemplary aspect of the present disclosure includes, among other things, a contactor and a controller programmed to command a vibration across portions of the contactor as part of a weld release control strategy when the contactor is welded closed.

In a further non-limiting embodiment of the foregoing contactor system, the contactor includes a stationary contact, a movable contact, an armature shaft, and a coil.

In a further non-limiting embodiment of either of the foregoing contactor systems, the weld release control strategy includes repeatedly alternating between energizing and de-energizing the coil of the contactor to apply the vibration.

In a further non-limiting embodiment of any of the foregoing contactor systems, energizing and de-energizing the coil is configured to move the armature shaft to apply the vibration.

In a further non-limiting embodiment of any of the foregoing contactor systems, the movable contact is connected to the armature shaft.

In a further non-limiting embodiment of any of the foregoing contactor systems, the controller is further programmed to command a second contactor to an open position as part of the weld release control strategy.

In a further non-limiting embodiment of any of the foregoing contactor systems, the vibration is configured to mechanically shock a contact of the contactor.

In a further non-limiting embodiment of any of the foregoing contactor systems, the contact is a movable contact, a stationary contact, or both.

In a further non-limiting embodiment of any of the foregoing contactor systems, a sensor system is operably coupled to the controller and configured to monitor a characteristic of the contactor.

In a further non-limiting embodiment of any of the foregoing contactor systems, the controller is further programmed to infer that the contactor is welded closed based on feedback from the sensor system.

In a further non-limiting embodiment of any of the foregoing contactor systems, the contactor system is part of a traction battery pack.

In a further non-limiting embodiment of any of the foregoing contactor systems, the traction battery pack is part of an electrified vehicle.

A method according to another exemplary aspect of the present disclosure includes, among other things, monitoring whether a contactor of a contactor system is welded closed, and mechanically shocking the contactor when the contactor is welded closed.

In a further non-limiting embodiment of the foregoing method, the monitoring includes measuring a voltage across the contactor and a second contactor while the contactor is in a closed position and the second contactor is in an open position.

In a further non-limiting embodiment of either of the foregoing methods, mechanically shocking the contactor includes vibrating a contact of the contactor.

In a further non-limiting embodiment of any of the foregoing methods, mechanically shocking the contactor includes energizing a coil of the contactor, and de-energizing the coil of the contactor.

In a further non-limiting embodiment of any of the foregoing methods, the method includes repeatedly alternating between the energizing and the de-energizing for a predefined number of cycles to mechanically shock the contactor.

In a further non-limiting embodiment of any of the foregoing methods, the energizing and the de-energizing moves an armature shaft of the contactor in order to mechanically shock the contactor.

In a further non-limiting embodiment of any of the foregoing methods, the method includes determining whether the contactor remains welded closed subsequent to mechanically shocking the contactor.

In a further non-limiting embodiment of any of the foregoing methods, the method includes notifying a user of a servicing need subsequent to mechanically shocking the contactor.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes systems and methods for releasing welded-shut contactors of a contactor system. An exemplary contactor system may include one or more contactors and a controller. The controller may be programmed to command a vibration across portions of the contactor as part of a weld release control strategy when the contactor is welded closed. The vibration may be achieved by repeatedly alternating between energizing and de-energizing a coil of the contactor in order to mechanically shock/vibrate a welded contact of the contactor. These and other features of this disclosure are discussed in greater detail in the following paragraphs of this detailed description.

Figure 1:
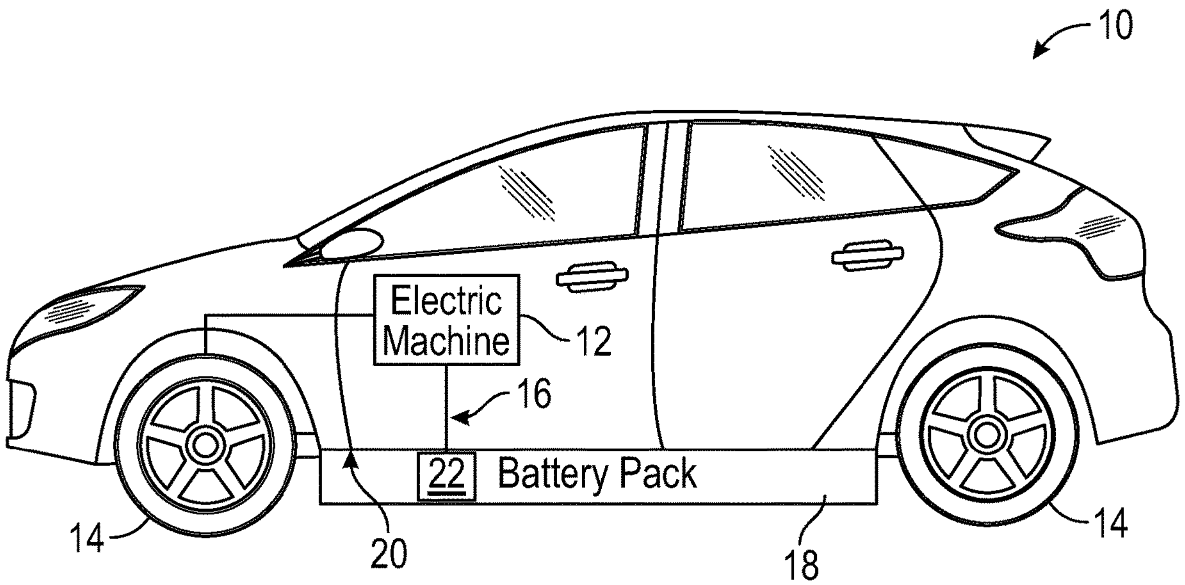
FIG. 1 schematically illustrates an electrified vehicle that includes a traction battery pack.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack assembly that includes one or more battery arrays (i.e., battery assemblies or groupings of rechargeable battery cells) capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be secured to an underbody 20 of the electrified vehicle 10. However, the traction battery pack 18 could be located elsewhere on the electrified vehicle 10 within the scope of this disclosure.

The traction battery pack 18 may additionally include a contactor system 22. The contactor system 22 may be configured to selectively isolate/couple the traction battery pack 18 from/to other components that are part of the voltage bus 16 of the electrified vehicle 10. The contactor system 22 may include one or more sets of contactors that may be controlled to open and close the high voltage power lines that connect between the various components located on the voltage bus 16. For example, the contactors of the contactor system 22 may be moved to closed positions to operably connect the traction battery pack 18 to the electric machine 12 for powering the electric machine 12 to achieve electric propulsion. Alternatively, the contactors of the contactor system 22 may be moved to open positions to decouple the traction battery pack 18 from the components of the high bus 16, such as to operably disconnect the traction battery pack 18 from the electric machine 12, for example.

In an embodiment, the contactor system 22 is a component of the traction battery pack 18. For example, the contactor system 22 could be part of a bussed electrical center (BEC) packaged inside the traction battery pack 18. However, the contactor system 22 could be packaged elsewhere within the traction battery pack 18 or could alternatively be packaged outside of the traction battery pack 18 within the scope of this disclosure.

Figure 2:
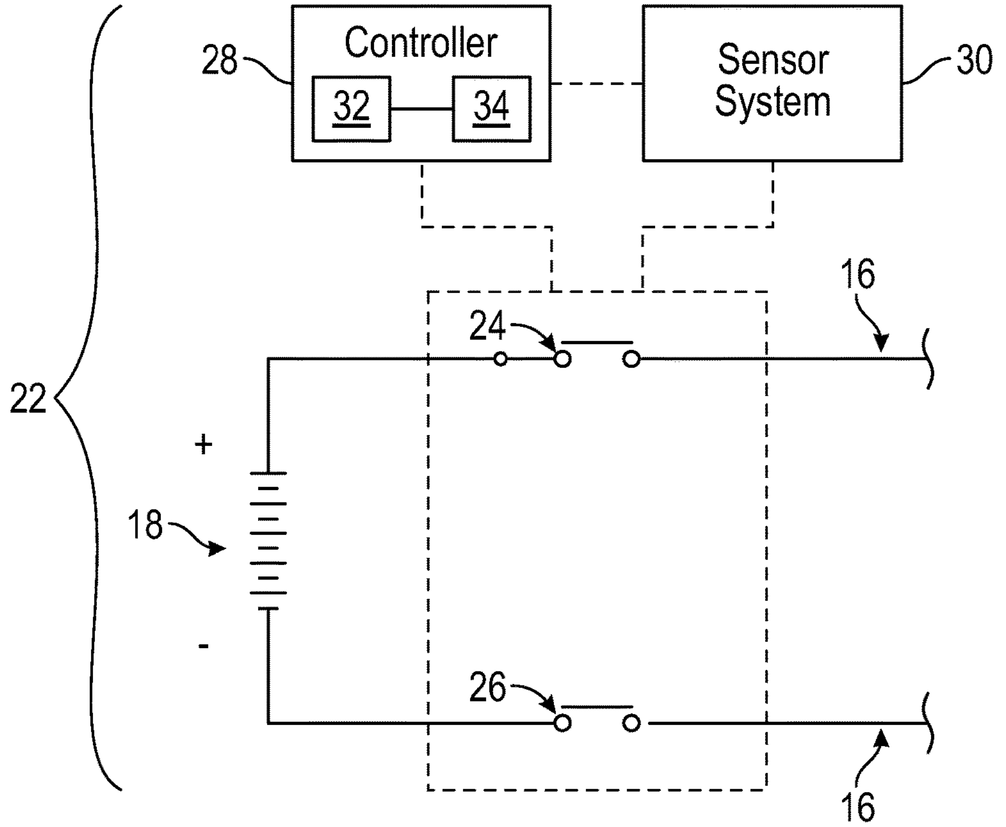
FIG. 2 schematically illustrates a contactor system of the traction battery pack of FIG. 1.

FIG. 2 illustrates an exemplary contactor system 22 of the traction battery pack 18. The contactor system 22 may electrically connect and disconnect the traction battery pack 18 from portions (e.g., the electric machine 12) of the powertrain of the electrified vehicle of FIG. 1.

The contactor system 22 may include a first contactor 24 and a second contactor 26. The first contactor 24 may be associated with a positive terminal (+) of the traction battery pack 18, and the second contactor 26 may be associated with a negative terminal (−) of the traction battery pack 18.

A controller 28 (e.g., a battery energy control module (BECM)) of the contactor system 22 may control the first contactor 24 and the second contractor 26 between their respective open and closed positions. For example, during a drive cycle of the electrified vehicle 10, the controller 28 may command the first contactor 24 and the second contactor 26 to close to allow free flow of current to and from the traction battery pack 18. The controller 28 may subsequently, at the conclusion of the drive cycle, command the first contactor 24 and the second contactor 26 to open, thereby preventing current from flowing from the traction battery pack 18 to other areas of the voltage bus 16. The controller 28 may also individually control the first contactor 24 and the second contactor 26 such that, in some operating conditions, one of the first contactor 24 or the second contactor 26 is commanded open while the other of the first contactor 24 or the second contactor 26 is commanded closed.

Although not specifically shown in the highly schematic depiction of FIG. 2, the contactor assembly 22 may further include additional contactors, such as precharge contactors, charging contactors, etc. The controller 28 may selectively activate the additional contactors to control current flow to/from the traction battery pack 18.

The contactor system 22 may additionally include a sensor system 30. The sensor system 30 may include one or more sensors configured for monitoring characteristics associated with each of the first contactor 24 and the second contactor 26. For example, the sensor system 30 may be configured to sense a voltage of the current flowing through each of the first contactor 24 and the second contactor 26 or other contactors being controlled. The sensed characteristics may be communicated to the controller 28. The controller 28 may be programmed to control the contactor system 22 in various ways depending on the feedback received from the sensor system 30.

The controller 28 may include a processor 32 and non-transitory memory 34 for executing various control strategies and modes associated with the contactor system 22. The processor 32 may be a custom made or commercially available processor, microcontroller, a central processing unit (CPU), or generally any device for executing software instructions. The memory 34 may include any one or combination of volatile memory elements and/or nonvolatile memory elements. The processor 32 may be operably coupled to the memory 34 and may be configured to execute one or more programs stored in the memory 34 based on the various inputs, including but not limited to inputs received from the sensor system 30, for example.

The first contactor 24 and/or the second contactor 26 may undesirably weld closed during vehicle powertrain operation. The welded contactor(s) can be caused by a contact chatter condition, which typically results from insufficient contact forces between the contacts of the contactor. When chatter occurs, high currents passing through the contacts can cause melting, thereby resulting in welding the contacts together. If not addressed, the welded closed contactor can temporarily render the electrified vehicle 10 inoperable. This disclosure is therefore directed to contactor weld releasing systems and methods that are configured to release contactor welds in order to maintain vehicle operability.

Figure 3A:
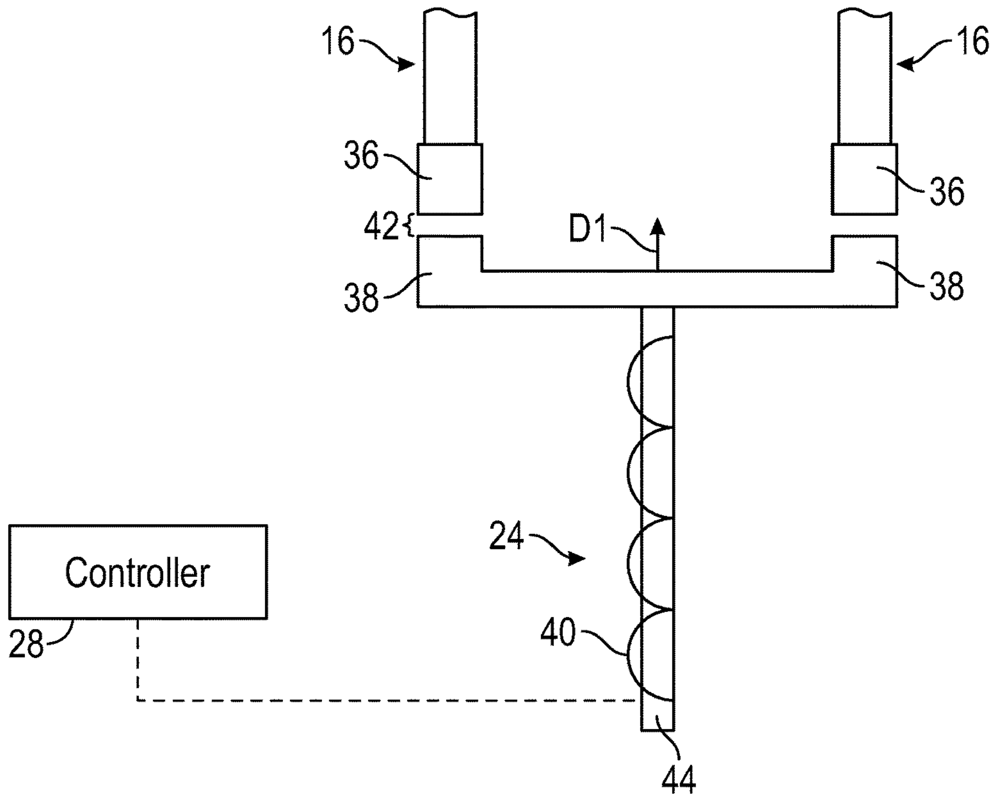
FIGS. 3A, 3B, and 3C illustrate various states of a contactor of the contactor system of FIG. 2.
Figure 3B:
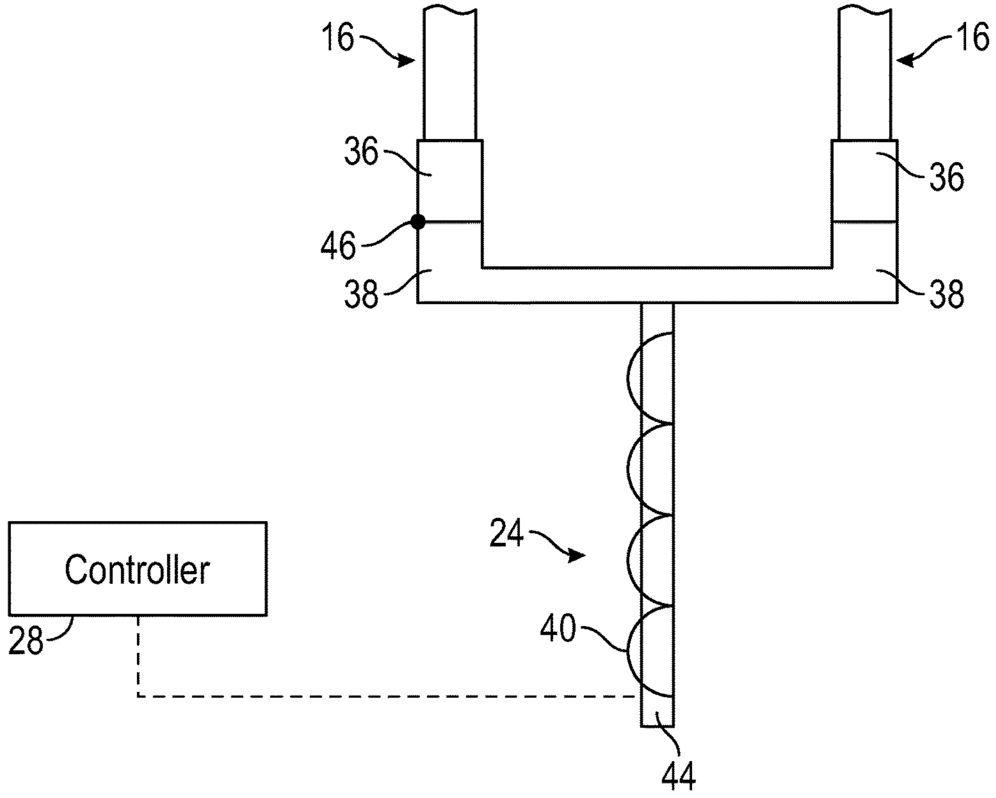
Figure 3C:
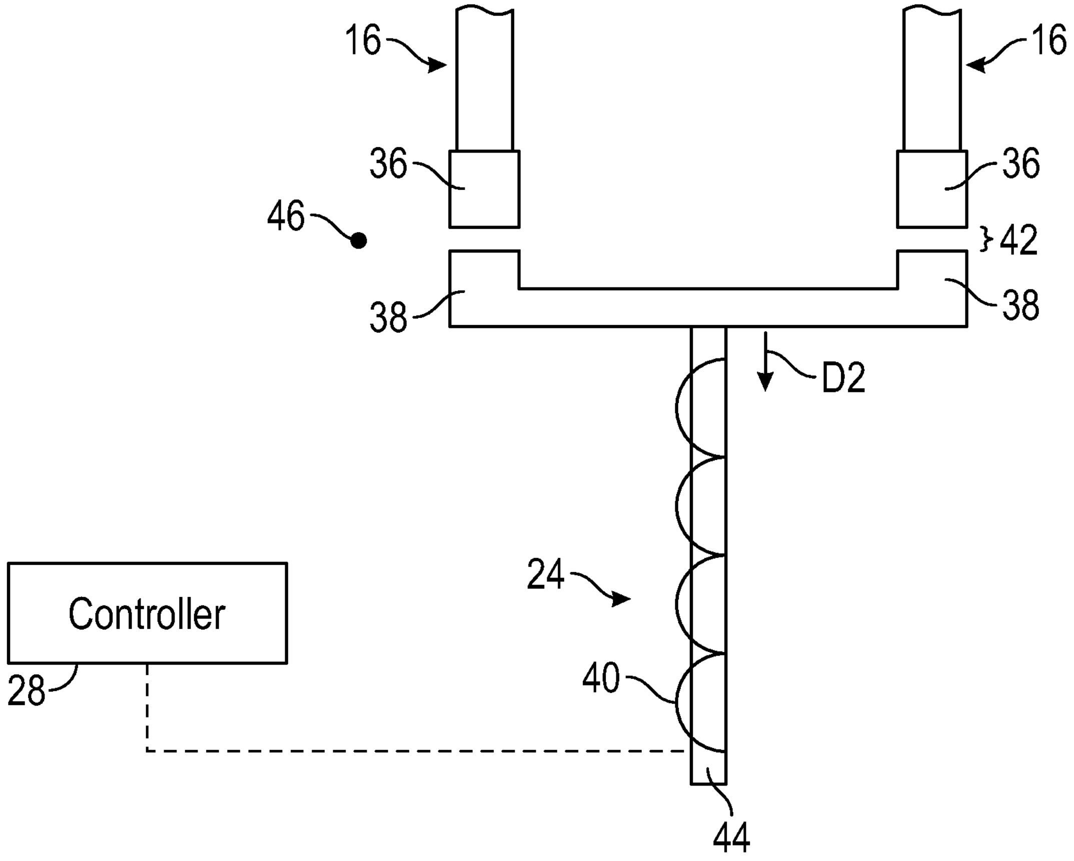

FIGS. 3A, 3B, and 3C illustrate an exemplary design of the first contactor 24 of the contactor system 22. As can be appreciated, the second contactor 26 may include a substantially identical configuration as the one shown in FIGS. 3A-3C.

The first contactor 24 may include at least one stationary contact 36 (two shown in FIG. 3A), at least one movable contact 38 (two shown in FIG. 3A), and a coil 40. In an embodiment, the stationary contacts 36 are high voltage pins. The stationary contacts 36 connect to the voltage bus 16. In another embodiment, the movable contacts 38 are part of a unitary structure, such as a busbar structure, for example. However, other configurations are also contemplated within the scope of this disclosure.

The first contactor 24 is depicted in an open position in FIG. 3A. In the open position, the movable contacts 38 are spaced from the stationary contacts 36 such that a gap 42 extends therebetween. In such a position, the traction battery pack 18 is isolated from the voltage bus 16.

The movable contacts 38 may be carried together (e.g., in unison) by an armature shaft 44. The coil 40 may be at least partially wrapped around the armature shaft 44. Energization of the coil 40 may be controlled by the controller 28 to control movement of the armature shaft 44. For example, in order to close the first contactor 24 of the contactor system 22, the coil 40 may be energized by a current to move the movable contacts 38 in a direction D1 toward the stationary contacts 36.

The first contactor 24 is depicted in the closed position in FIG. 3B. In the closed position, the movable contacts 38 are positioned in abutting contact with the stationary contacts 36 (e.g., the gap 42 shown in FIG. 3A has been closed). Once the first contactor 24 is closed, high voltage current may flow through the stationary contacts 36 to the voltage bus 16 for powering one or more loads (e.g., the electric machine 12) of the electrified vehicle 10.

Certain operating conditions (e.g., chatter conditions) may result in the formation of a weld 46 between one or both pairs of the movable contacts 38 and the stationary contacts 36. The weld 46 can cause the movable contacts 38 and stationary contacts 36 to stick together. This first contactor 24 may be considered welded closed when the weld 46 is present.

The controller 28 may control the first contactor 24 to dislodge the weld 46 and break the movable contacts 38 free from the stationary contacts 36 as part of a weld release control strategy. The weld release control strategy may involve vibrating the movable contacts 38 and/or stationary contacts 36, such as by repeatedly alternating between energizing and then de-energizing the coil 40 of the first contactor 24 at a full voltage/current level (e.g., full power capability of the power source) for a predefined number of cycles (e.g., between about 2 and about 10 cycles). The relatively strong magnetic force applied to the coil 40 during the energizing/de-energizing causes a sudden movement of the armature shaft 44, thereby resulting in a mechanical shock or jolt that is applied across the movable contacts 38 and the stationary contacts 36. The repeated energization and de-energization of the coil 40 for a number of predefined cycles can dislodge and release the weld 46, thus allowing the movable contacts 38 to move in a direction D2 away from the stationary contacts 36 (see FIG. 3C). Releasing the weld 46 in this manner ensures continued operability of the electrified vehicle 10 without the need to immediately service the vehicle.

Figure 4:
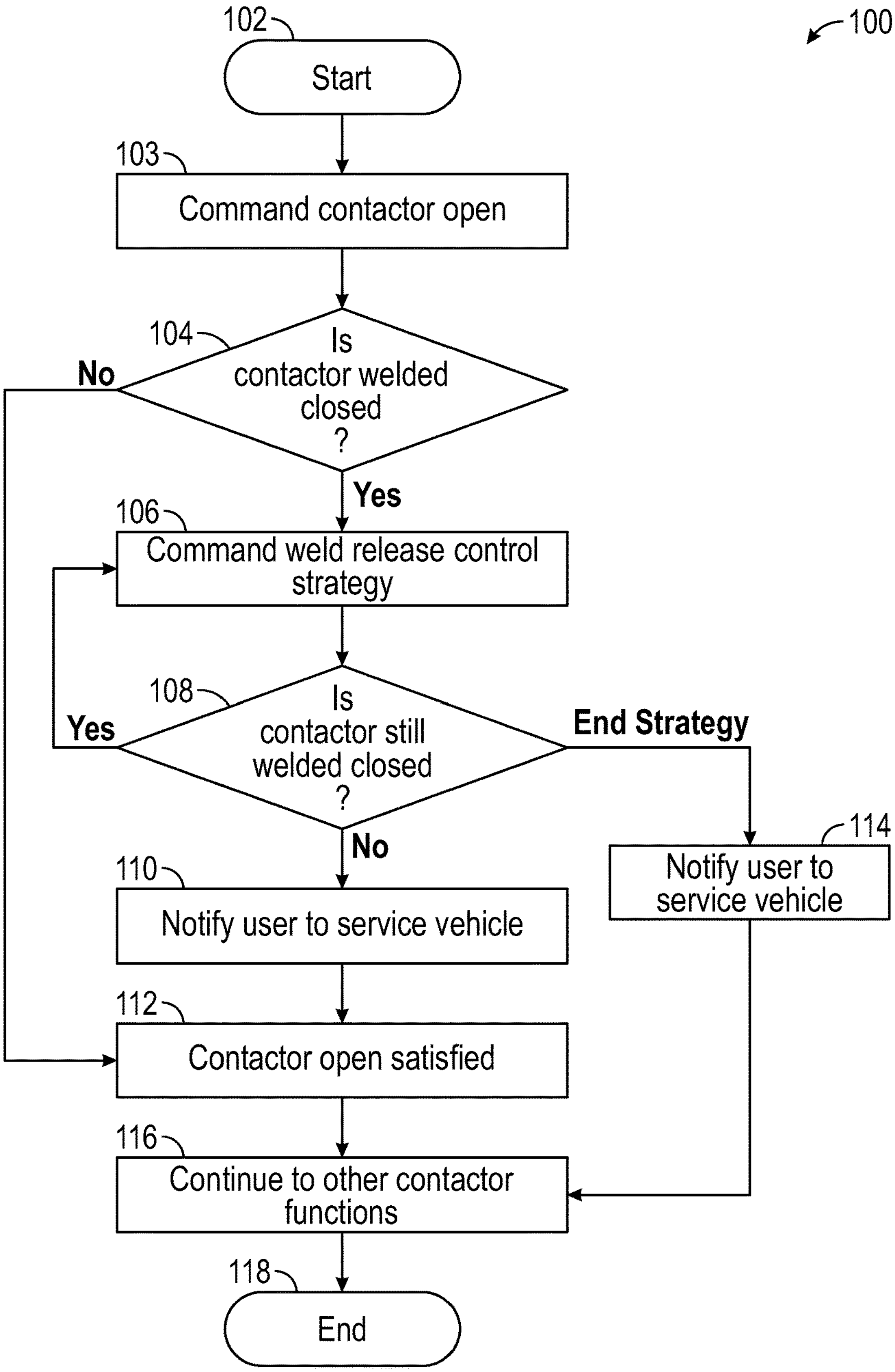
FIG. 4 is a flow chart of an exemplary method for releasing a contactor that has welded closed.

FIG. 4, with continued reference to FIGS. 1-3C, schematically illustrates in flow chart form an exemplary method 100 for releasing a contactor that has welded closed. The controller 28 of the contactor system 22 may be configured to employ one or more algorithms adapted to execute at least a portion of the steps of the exemplary method 100. For example, the method 100 may be stored as executable instructions in the memory 34 of the controller 28, and the executable instructions may be embodied within any computer readable medium that can be executed by the processor 32 of the controller 28.

The exemplary method 100 may begin at block 102. At block 103, the method 100 may command the contactor 24, 26 to the open position. At block 104, the method 100 may determine whether the first contactor 24 and/or the second contactor 26 of the contactor system 22 has welded closed. This step may include analyzing feedback from the sensor system 30 to infer whether one or more welds 46 are present on the first contactor 24 and/or the second contactor 26 and/or others. For example, the controller 28 may determine that one or more of the contactors 24, 26 has welded closed when a voltage reading across each contactor 24, 26 is equal while one of the first contactor 24 or the second contactors 26 is in the open position when both may have been expected to be in the open position. Other methodologies may be utilized to infer a fault condition of the contactor system 22 due to welding.

If a weld 46 is not detected at block 104, the method 100 may proceed directly to block 112. Alternatively, if a weld 46 is detected at block 104, the method 100 may proceed to block 106. A weld release control strategy may be initiated at this step. The weld release control strategy may involve taking specific actions to create vibration across the movable contacts 38 and/or the stationary contacts 36. In an embodiment, during the weld release control strategy, the controller 28 may repeatedly alternate between energizing and then de-energizing the coil 40 of the contactor 24, 26 that is welded closed in order to apply the mechanical shock/vibration across the movable contacts 38 and/or the stationary contacts 36. The contactor 24, 26 that is not welded closed is maintained in the open position during this step. The energizing/de-energizing sequence may be repeated for a predefined number of cycles. The actual number of cycles can vary depending on the contactor design, electrical driver capability, weld strength, etc. In some implementations, de-energizing the coil 40 may include reversing the polarity of the contractor 24, 26.

Next, at block 108, the method 100 may attempt to determine whether the contactor 24, 26 remains welded closed. If YES, the method 100 may return to block 106. If NO, the method 100 may proceed to block 110 by notifying the user that vehicle servicing may be necessary. Providing the notification may include illuminating an instrument panel notification light, for example. The method 100 may then determine that the contactor opening has been satisfied at block 112, and then continue to other contactor functions at block 116.

If, at block 108, the contactor 24, 26 remains welded closed after a predefined number of checks, the method 100 may instead end the weld release control strategy 100 by proceeding to block 114 directly from block 108. At this step, the method 100 may notify the user to service the vehicle. The method 100 may then proceed to block 116 by continuing on to other contactor-related functions. The method 100 may then end at block 118.

The contactor systems of this disclosure are configured to respond to contactor welded closed conditions by performing a novel weld release control strategy. The weld release control strategy may involve vibrating the contactor contacts with repeated mechanical shocks in order to dislodge the weld. The proposed systems and methods are simple and inexpensive to implement and can be performed to maintain vehicle operability.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A contactor system, comprising:
- a contactor; and
- a controller programmed to command a vibration across portions of the contactor as part of a weld release control strategy when the contactor is welded closed.

2. The contactor system as recited in claim 1, wherein the contactor includes a stationary contact, a movable contact, an armature shaft, and a coil.

3. The contactor system as recited in claim 2, wherein the weld release control strategy includes repeatedly alternating between energizing and de-energizing the coil of the contactor to apply the vibration.

4. The contactor system as recited in claim 3, wherein energizing and de-energizing the coil is configured to move the armature shaft to apply the vibration.

5. The contactor system as recited in claim 4, wherein the movable contact is connected to the armature shaft.

6. The contactor system as recited in claim 1, wherein the controller is further programmed to command a second contactor to an open position as part of the weld release control strategy.

7. The contactor system as recited in claim 1, wherein the vibration is configured to mechanically shock a contact of the contactor.

8. The contactor system as recited in claim 7, wherein the contact is a movable contact, a stationary contact, or both.

9. The contactor system as recited in claim 1, comprising a sensor system operably coupled to the controller and configured to monitor a characteristic of the contactor.

10. The contactor system as recited in claim 9, wherein the controller is further programmed to infer that the contactor is welded closed based on feedback from the sensor system.

11. A traction battery pack comprising the contactor system of claim 1.

12. An electrified vehicle comprising the traction battery pack of claim 11.

13. A method, comprising:
- monitoring whether a contactor of a contactor system is welded closed; and
- mechanically shocking the contactor when the contactor is welded closed.

14. The method as recited in claim 13, wherein the monitoring includes measuring a voltage across the contactor and a second contactor while the contactor is in a closed position and the second contactor is in an open position.

15. The method as recited in claim 13, wherein mechanically shocking the contactor includes vibrating a contact of the contactor.

16. The method as recited in claim 13, wherein mechanically shocking the contactor includes:
- energizing a coil of the contactor; and
- de-energizing the coil of the contactor.

17. The method as recited in claim 16, comprising:
- repeatedly alternating between the energizing and the de-energizing for a predefined number of cycles to mechanically shock the contactor.

18. The method as recited in claim 16, wherein the energizing and the de-energizing moves an armature shaft of the contactor in order to mechanically shock the contactor.

19. The method as recited in claim 13, comprising:
- determining whether the contactor remains welded closed subsequent to mechanically shocking the contactor.

20. The method as recited in claim 13, comprising:
- notifying a user of a servicing need subsequent to mechanically shocking the contactor.

* * * * *